Patented Jan. 21, 1936

2,028,518

UNITED STATES PATENT OFFICE 2,028,518

CELL OF THE SOLID ELECTROLYTE TYPE

René Oppenheim, Gennevilliers, France, assignor to Societe Anonyme Le Carbone, Gennevilliers, France No Drawing. Application November 29, 1933, Serial No. 700,348. In France December 5, 1932

4 Claims. (Cl. 136—158)

This invention refers to primary electric cells having a solid electrolyte, and particularly of the type wherein the electrolyte is initially supplied in dry form and the cells placed in service by adding water.

It is a well known fact that the efficiency, volume for volume, of so-called dry cells or of cells having a solid electrolyte, is greater than that of cells with liquid electrolyte, owing to the slower diffusion of the salts in the electrolyte of the former, and to the less rapid increase of the internal resistance resulting therefrom when the cell is in actual course of operation.

However, cells of the solid electrolyte type have some drawback, for when stored, they cannot be maintained in perfect condition, or, in other words, between the time they are manufactured and the time they are put into service, various phenomena arise and contribute in diminishing the ultimate efficiency of the cell.

In order to remedy these defects, various expedients have been proposed, which substantially consist either in constructing fluid-tight cells, in which the electrolyte is introduced only at the time of use, or in making so-called "startable" cells in which, by the addition of water or of a solution of sal ammoniac, a more or less solid electrolyte is obtained and a cell having most of the characteristics of the so-called dry cells.

In the first case, the electrolyte is always liable to leak out because it is not solid. In the second case, on the one hand, it is necessary to use a solidifying material capable of acting in the cold state, but the action of the same is imperfect and sometimes prejudicial, the bodies used frequently have acid reactions which considerably reduce the life of the cell, while, on the other hand, the solidifying agent is necessarily placed beforehand in the cell when the latter is being manufactured.

The present invention is designed to remedy all these drawbacks and essentially consists in utilizing the solvent property presented by some bases, such as caustic soda, potash, etc., while simultaneously producing a considerable increase of temperature. It is thus possible to use for solidifying the electrolyte, such bodies as flour, fecula, etc., which have to be cooked in order to become adapted for use.

On the other hand, it is thus possible, to mix the product adapted to form the solidifying agent, with the ingredients constituting the electrolyte and, particularly, caustic soda, so as to obtain a dry initial mixture forming a charge prepared beforehand and which has simply to be incorporated with water for use as is customary for the preparation of cells of the liquid electrolyte type.

In these conditions, a cell can be constructed in an extremely simple manner, similar to that employed for cells of the liquid electrolyte type, by means of two independent electrodes, one of which, for instance, is made of carbon, and the other of zinc, contained in any vessel, such as glass vessel for instance. The assemblage is effected at the time the cell is to be used by mixing the prepared charge with water contained in a jar, and then simply placing both electrodes therein. The heat evolved by contact of the base with the water causes the solidifying material to be cooked and to be converted into a jelly. After a variable period of time, solidification takes place. A cell having the characteristics of a cell of the solid electrolyte type is thus obtained, that is to say, having a very high efficiency, a nearly complete absence of creeping salts and an extremely reduced rate of evaporation.

Moreover, the crystals formed by chemical action during the operation of the cell are retained in the gelatinous electrolyte, so that at the end of the discharge, the cell can be very easily taken to pieces while no cleaning is necessary and the labor expenses for the maintenance of such cells are, therefore, considerably reduced.

When the discharge of the cells is intended to be very slow, it may be advantageous to provide means adapted to further avoid evaporation and the formation of creeping salts. In this case, the electrolyte can be formed essentially as above stated, i. e. by using caustic soda and a solidifying agent, to which a fatty body can be added, such as paraffin, which is solid at any ordinary temperature, but melts at a relatively low temperature. As the base, such as soda, dissolves, it causes an evolution of heat which then liquefies the fatty body, while the low density of said fatty body causes it to float on the surface and, when the temperature of the electrolyte again becomes normal, the cell is covered with a uniform and solidified layer of the fatty body which completely prevents evaporation and the formation of creeping salts.

To said base, such as caustic soda, can also be added certain bodies adapted to improve the discharge curve of the cell, such as sodium chloride, as disclosed in the French patent application filed on the 8th August, 1932, for "Improvements in cells of the liquid electrolyte type".

The above arrangements are given only by way of example; the forms, dimensions, materials used and all detail arrangements can be modified according to circumstances without departing thereby from the principle of the invention.

What I claim as my invention and desire to secure by Letters Patent is:—

1. The combination, in an electric cell of the solid electrolyte type, of an initially dry electrolyte mixture comprising a solidifying agent in the form of a quantity of dry flour, fecula or the like which is capable of being converted to a jelly by cooking, and an active ingredient comprising an alkaline base of the class of soda and potash which, upon addition of water to the dry mixture to put the cell into service, is capable of producing a sufficient amount of heat within said cell to cook said solidifying agent in situ and cause the same together with said active ingredient to solidify into a jelly-like mass of electrolyte.

2. The combination, in an electric cell of the solid electrolyte type, of an initially dry and inactive electrolyte mixture comprising a solidifying agent in the form of a quantity of uncooked dry flour, fecula or the like which is capable of being converted to a jelly by cooking the same and an active ingredient comprising an alkaline base of the class of soda and potash which, upon addition of water to the dry mixture to put the cell into service, is capable of producing a sufficient amount of heat within said cell to cook said solidifying agent in situ and cause the same together with said active ingredient to solidify into a jelly-like mass of active electrolyte.

3. The combination, in an electric cell of the solid electrolyte type, of an initially dry and inactive electrolyte mixture comprising a solidifying agent in the form of a quantity of dry flour, fecula or the like which is capable of being converted to a jelly by cooking the same, a suitable amount of caustic soda which, upon addition of water to the dry mixture to put the cell into service, is capable of producing a sufficient amount of heat within said cell to cook said solidifying agent in situ and cause the same together with said active ingredient to solidify into a jelly-like mass of active electrolyte, and a limited amount of common salt serving to improve the discharge curve of the cell.

4. In an electric cell of the solid electrolyte type wherein the electrolyte in said cell has an initially dry and uncooked solidifying agent capable of being subsequently cooked, such as flour, fecula and the like, an initially dry active ingredient for said electrolyte comprising an alkaline base of the class of soda and potash mixed dry with said solidifying agent preparatory to adding water in order to start operation of the cell and which alkaline base, upon such addition of water is capable of producing a sufficient amount of heat within said cell to cook said solidifying agent in situ and cause the same together with said active ingredient to solidify into a jelly-like mass of electrolyte.

RENÉ OPPENHEIM.